(12) United States Patent
Moon et al.

(10) Patent No.: US 11,057,855 B2
(45) Date of Patent: Jul. 6, 2021

(54) METHOD OF DETECTING ACCESS ADDRESS OF BLUETOOTH SIGNAL TO WHICH CHANNEL CODING IS APPLIED AND BLUETOOTH APPARATUS THEREOF

(71) Applicant: ABOV Semiconductor co., Ltd., Cheongju-si (KR)

(72) Inventors: Ki Tae Moon, Seoul (KR); Sang Young Chu, Bucheon-si (KR); Suk Kyun Hong, Seoul (KR)

(73) Assignee: ABOV Semiconductor co., Ltd., Cheongju-si (KR)

( * ) Notice: Subject to any disclaimer, the term of this patent is extended or adjusted under 35 U.S.C. 154(b) by 120 days.

(21) Appl. No.: 16/156,999

(22) Filed: Oct. 10, 2018

(65) Prior Publication Data

US 2019/0166573 A1 May 30, 2019

(30) Foreign Application Priority Data

Nov. 24, 2017 (KR) .................. 10-2017-0157993

(51) Int. Cl.
*H04W 56/00* (2009.01)
*H04W 4/70* (2018.01)
*H04L 7/04* (2006.01)
*H04L 27/26* (2006.01)

(52) U.S. Cl.
CPC ......... *H04W 56/0035* (2013.01); *H04L 7/041* (2013.01); *H04L 7/042* (2013.01); *H04L 27/2656* (2013.01); *H04W 4/70* (2018.02); *H04W 56/004* (2013.01)

(58) Field of Classification Search
CPC ....... H04W 4/70; H04W 4/80; H04W 56/001; H04W 56/004; H04W 56/0035; H04W 56/0045; H04W 56/005; H04W 76/10; H04W 76/14; H04W 84/18; H04L 7/04; H04L 7/041; H04L 7/042; H04L 27/2647; H04L 27/2655; H04L 27/2656
See application file for complete search history.

(56) References Cited

U.S. PATENT DOCUMENTS

| 8,824,606 | B2 | 9/2014 | Cheng et al. | |
|---|---|---|---|---|
| 10,674,459 | B2* | 6/2020 | O'Brien | H04W 52/52 |
| 2009/0180464 | A1* | 7/2009 | Walley | H04L 7/042 |
| | | | | 370/350 |
| 2017/0238328 | A1* | 8/2017 | Luong | H04L 43/16 |
| | | | | 370/329 |

* cited by examiner

*Primary Examiner* — Peter Chen

(57) ABSTRACT

The present invention relates to a method of detecting an access address of a physical channel in a Bluetooth signal to which channel coding is applied, the method including: performing initial signal processing in a unit of a specific length in a preamble section of a Bluetooth signal; and performing channel decoding in the specific length for a preamble part remained after the initial signal processing, wherein the specific length is a bit pattern length of a bitstream which is repeated in the preamble section or a length of a bitstream input for channel decoding. According to the present invention, channel decoding is performed in a unit of a bit pattern length of an access address from the remaining preamble part, and thus detection of the access address is available even though a start point of the access address is not provided.

4 Claims, 8 Drawing Sheets

METHOD OF DETECTING ACCESS ADDRESS OF BLUETOOTH SIGNAL TO WHICH CHANNEL CODING IS APPLIED AND BLUETOOTH APPARATUS THEREOF

CROSS REFERENCE TO RELATED APPLICATION

The present application claims priority to Korean Patent Application No. 10-2017-0157993, filed Nov. 24, 2017, the entire contents of which is incorporated herein for all purposes by this reference.

BACKGROUND OF THE INVENTION

Field of the Invention

The present invention relates generally to a method of detecting an access address of a Bluetooth signal, and a Bluetooth apparatus thereof. More particularly, the present invention relates to a method and apparatus for detecting an access address of a physical channel in a Bluetooth signal to which channel coding is applied.

Description of the Related Art

A receiver of a 1 M PHY of Bluetooth 4.2 standard performs automatic gain control (AGC), frequency synchronization, packet detection, and symbol timing estimation by using a preamble of 8 bits, and determines whether or not a corresponding packet is a valid packet to be received by detecting an access address having a preset 32 bits. Herein, detection of the access address is performed by calculating a correlation value in a bit unit. After detecting a packet by using a preamble, when a bit correlation value of the packet received within a preset time exceeds a predetermined threshold value, the corresponding packet is determined to be a valid packet and is transferred to a link layer. Otherwise, the corresponding packet is determined not to be a valid packet and is thrown away.

In a coded PHY of Bluetooth 5.0 where the standardization work has been completed, rather than a conventional 1 M PHY transmission method, channel coding using a convolutional code and a repetition code is applied. A preamble has a length of 80 us in which an 8-bit pattern is repeated ten times, and channel coding is applied to an access address of 32 bits so that a length thereof becomes 256 us. A receiver of Bluetooth 5.0 performs automatic gain control, frequency synchronization, packet detection, and symbol timing estimation which are initial signal processing by using a preamble having a length of 80 us, and determines whether or not a received packet is valid by using an access address having a length of 256 us.

However, channel coding is not applied to a preamble in BLE 5.0 and channel coding is applied from an access address, and thus, the access address is detected by performing packet detection, AGC, and timing and frequency synchronization in a preamble section, by performing channel decoding for an access address part, and then by calculating a bit correlation value. Accordingly, an operational start point of channel decoding in the receiver may be determined when a boundary between the preamble of BLE 5.0 and the access address, that is, a start posing of the access address is recognized. Therefore, a method or an apparatus or both for detecting an access address even though a starting point of the access address is not provided, or for definitely detecting a start point of an access address may be required.

The foregoing is intended merely to aid in the understanding of the background of the present invention, and is not intended to mean that the present invention falls within the purview of the related art that is already known to those skilled in the art.

Documents of Related Art (Patent Document 1) U.S. Pat. No. 8,824,606

SUMMARY OF THE INVENTION

Accordingly, the present invention has been made keeping in mind the above problems occurring in the related art, and the present invention is intended to provide, in order to detect an access address of a physical channel in a Bluetooth signal to which channel coding is applied, an object of the present invention is to provide a method or apparatus or both for detecting an access address even though a start point of the access address is not provided, or for definitely detecting a start point of an access address.

In order to achieve the above object, according to an embodiment of the present invention, there is provided a method of detecting an access address of a Bluetooth signal to which channel coding is applied, the method including: performing initial signal processing in a unit of a specific length for a preamble section of a Bluetooth signal; and performing channel decoding in the specific length for a preamble part remained after the initial signal processing, wherein the specific length is a bit pattern length of a bitstream which is repeated in the preamble section or a length of a bitstream input for channel decoding.

The method may further include: extracting a correlation value in a bit unit with a preset access address from an output of the channel decoding; and determining that a valid access address is detected when the correlation value exceeds a threshold value.

The initial signal processing may be any one of automatic gain control, frequency synchronization, packet detection, and symbol timing estimation.

In order to achieve the above object, according to another embodiment of the present invention, there is provided a method of detecting an access address of a Bluetooth signal to which channel coding is applied, the method including: comparing a first bit pattern with a second bit pattern; and when the first bit pattern differs from the second bit pattern, determining the second bit pattern as a start point of an access address, wherein the first bit pattern is a bitstream having a specific length and which is repeated a predetermined times in a Bluetooth signal, and the second bit pattern is a bitstream having a length identical to the length of the first bit pattern.

The second bit pattern may be present in continuation to the first bit pattern and to which channel coding is applied.

The first bit pattern may be a bitstream of a preamble section of the received Bluetooth signal.

The method may further include starting channel decoding based on the determined start point of the access address.

The method may further include: extracting a correlation value in a bit unit with a preset access address from an output of the channel decoding; and determining that a valid access address is detected when the correlation value exceeds a threshold value.

In order to achieve the above object, according to another preferred embodiment of the present invention, there is provided a Bluetooth apparatus operating by using each method described above.

In addition, according to another preferred embodiment, there is provided a computer readable recording medium storing a program for executing each method described above.

As described above, according to the present invention, in order to detect an access address of a physical channel in a Bluetooth signal to which channel coding is applied, after performing automatic gain control, frequency synchronization, packet detection, and symbol timing estimation which are initial signal processing performed in a preamble section, channel decoding is performed in a unit of a bit pattern length of an access address from the remaining preamble part such that detection of the access address can be available even though a start point of the access address is not provided.

In addition, by using a feature that a bit pattern of a preamble and a bit pattern of an access address are different, a start point of the access address can be definitely detected.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
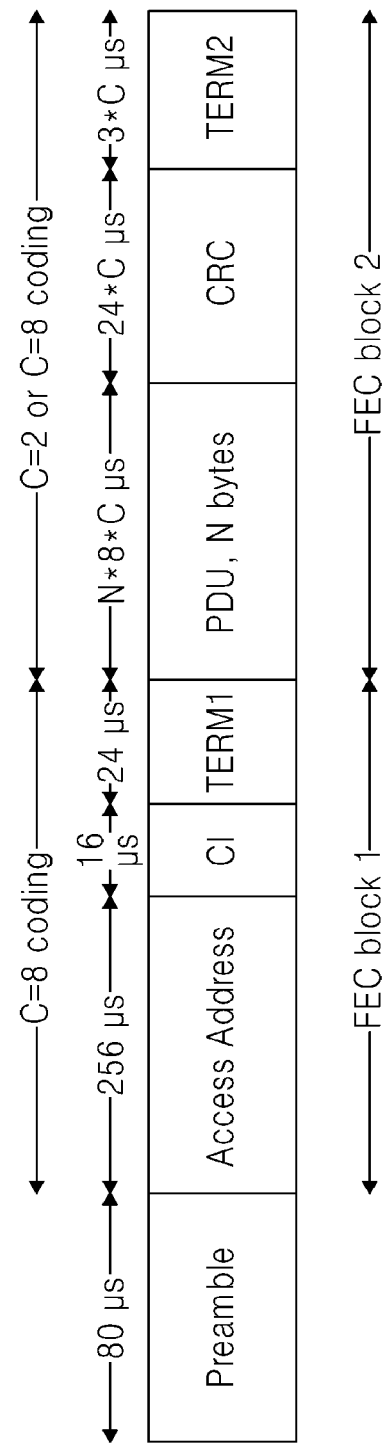
FIG. 1 is a view showing a packet configuration of a coded PHY of Bluetooth 5.0.

Hereinafter, embodiments of the present invention will be described in detail with reference to the accompanying drawings so that those skilled in the art can easily carry out the present invention. In the following description, it should be noted that only portions required for comprehension of operations according to the embodiments of the present invention will be described and descriptions of other portions will be omitted not to make subject matters of the present invention obscure. The present invention may, however, be embodied in many different forms and should not be construed as limited to the embodiments set forth herein.

In addition, it should be noted that the terms and words used in the specification and the claims described below are not intended to be interpreted as being normal or in a preliminary sense, and represent the present invention most appropriately to be able to interpret, it should be interpreted as meaning and concept conforming to the technical idea of the present invention.

Throughout this specification, unless explicitly described to the contrary, the word "comprise" and variations such as "comprises" or "comprising", will be understood to imply the inclusion of stated elements but not the exclusion of any other elements.

While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In describing the various embodiments of the present invention, corresponding components will be described with the same name and same reference numeral. In order to describe the embodiments of the present invention, the sizes of components, the thicknesses of lines, and the like may be exaggerated for convenience of understanding.

In addition, in an embodiment below, description will be made by using a coded PHY of Bluetooth 5.0 as an example, but it is not limited thereto. All cases using the similar communication standard to which channel coding is applied may be used.

For the description of the present invention, the standard and a general practical example of a Bluetooth signal to which channel coding is applied will be described first.

FIG. 1 is a view showing a packet configuration of a coded PHY of Bluetooth 5.0.

Referring to FIG. 1, a packet of a coded PHY of Bluetooth 5.0 is configured with a preamble section of 80 us, an access address/CI/TERM1 section received in 125 kbps, and a PDU/CRC/TERM2 section received in 125 kbps or 500 kbps. The preamble is used for automatic gain control, frequency synchronization, packet detection, and symbol timing estimation. The access address is used for channel synchronization in a link layer, the coding information (CI) includes information related whether or not the PDU/CRC/TERM2 section is transmitted in 125 kbps or 500 kbps, and the TERM1 represents termination bits of a convolutional encoder. The PDU includes data of an upper layer, the CRC is a part added for determining a bit error of the PDU, and the TERM2 also represents termination bits as the TERM1.

Figure 2:
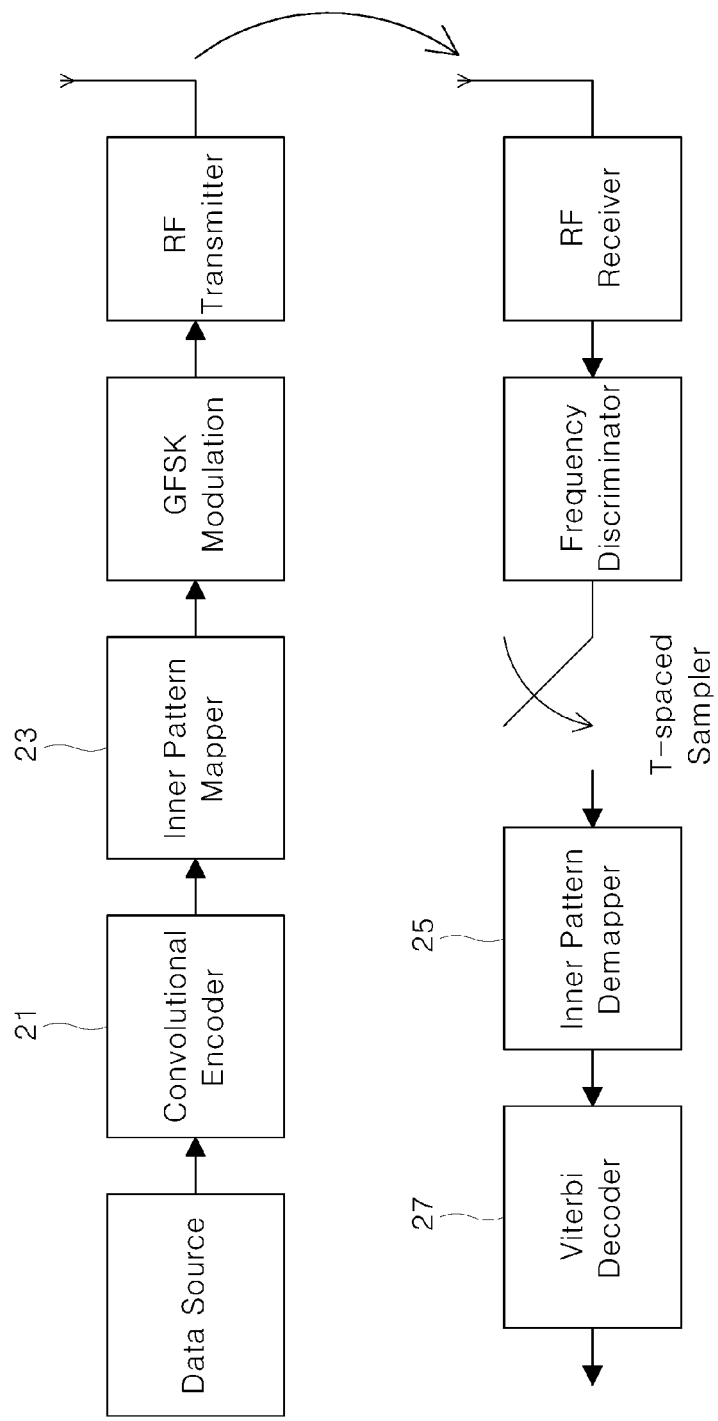
FIG. 2 a view showing a general transmitter and receiver of a coded PHY of Bluetooth 5.0.
Figure 3:
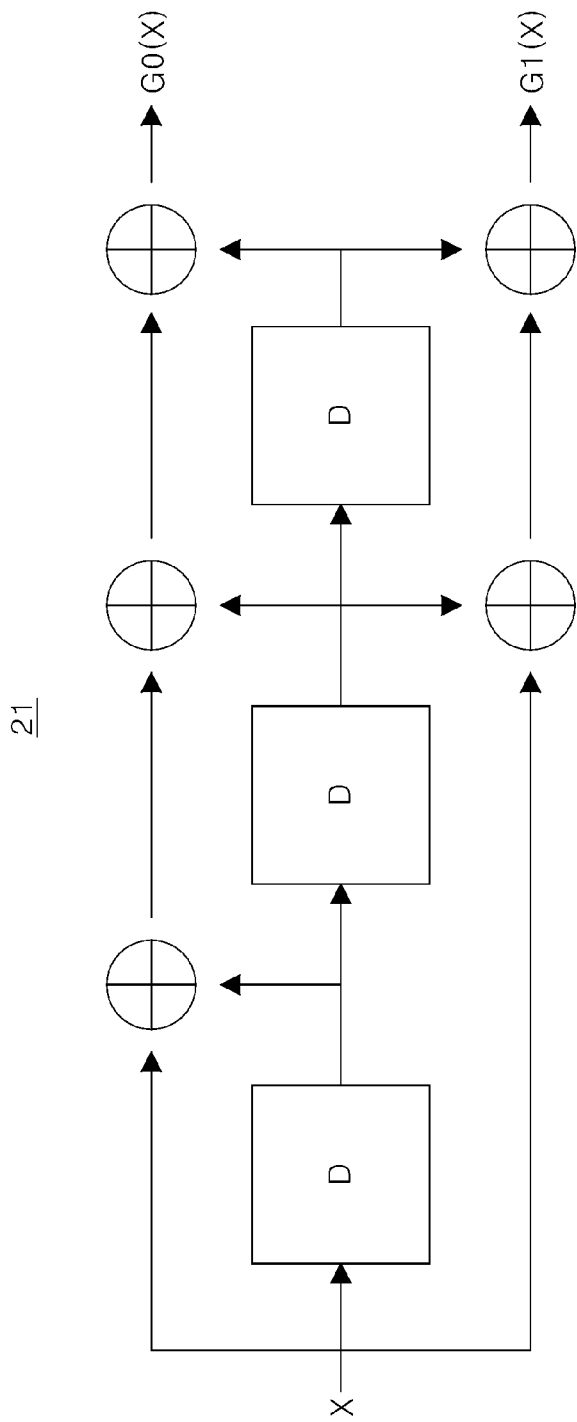
FIG. 3 is a view showing a convolutional encoder of a coded PHY of Bluetooth 5.0.
Figure 4:
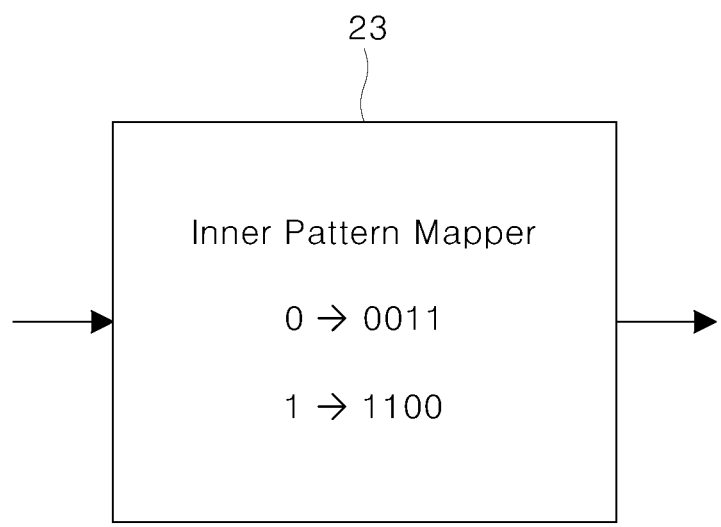
FIG. 4 is a view showing an inner pattern mapper of a coded PHY of Bluetooth 5.0.

FIGS. 2 to 4 are views showing a general transmitter and receiver used for a coded PHY of Bluetooth 5.0 and sub-blocks thereof.

Referring to FIG. 2, a general transmitter and receiver for a coded PHY of Bluetooth 5.0 is shown, a convolutional encoder 21 as a channel encoder and an inner pattern mapper 23 are added to a conventional 1 M PHY transmitter, and in the receiver, an inner pattern demapper 25, a Viterbi decoder 27 are required for performing a reverse process of the transmitter.

Referring to FIG. 3, a convolutional encoder 21 of the coded PHY of Bluetooth 5.0 is shown, the convolutional encoder 21 is configured with a shift register D and an adder according to the coded PHY of Bluetooth 5.0 standard, generates 2 bits as an output for 1 bit of an input, and the polynomial functions for generating the same are $G0(x)=1+$ $x+x^2+x^3$, and $G1(x)=1+x^2+x^3$. In addition, all initial states of the encoder are set to zero according to the standard.

Meanwhile, in FIG. 4, an inner pattern mapper 23 is shown, and the inner pattern mapper 23 outputs "0011" when an input bit is "0", and outputs "1100" when an input bit is "1" according to the standard.

As described above, the standard and a general practice example of a Bluetooth signal to which channel coding is applied has been described to help understand the present invention, and an embodiment of the present invention will be described based on the above.

Figure 5:
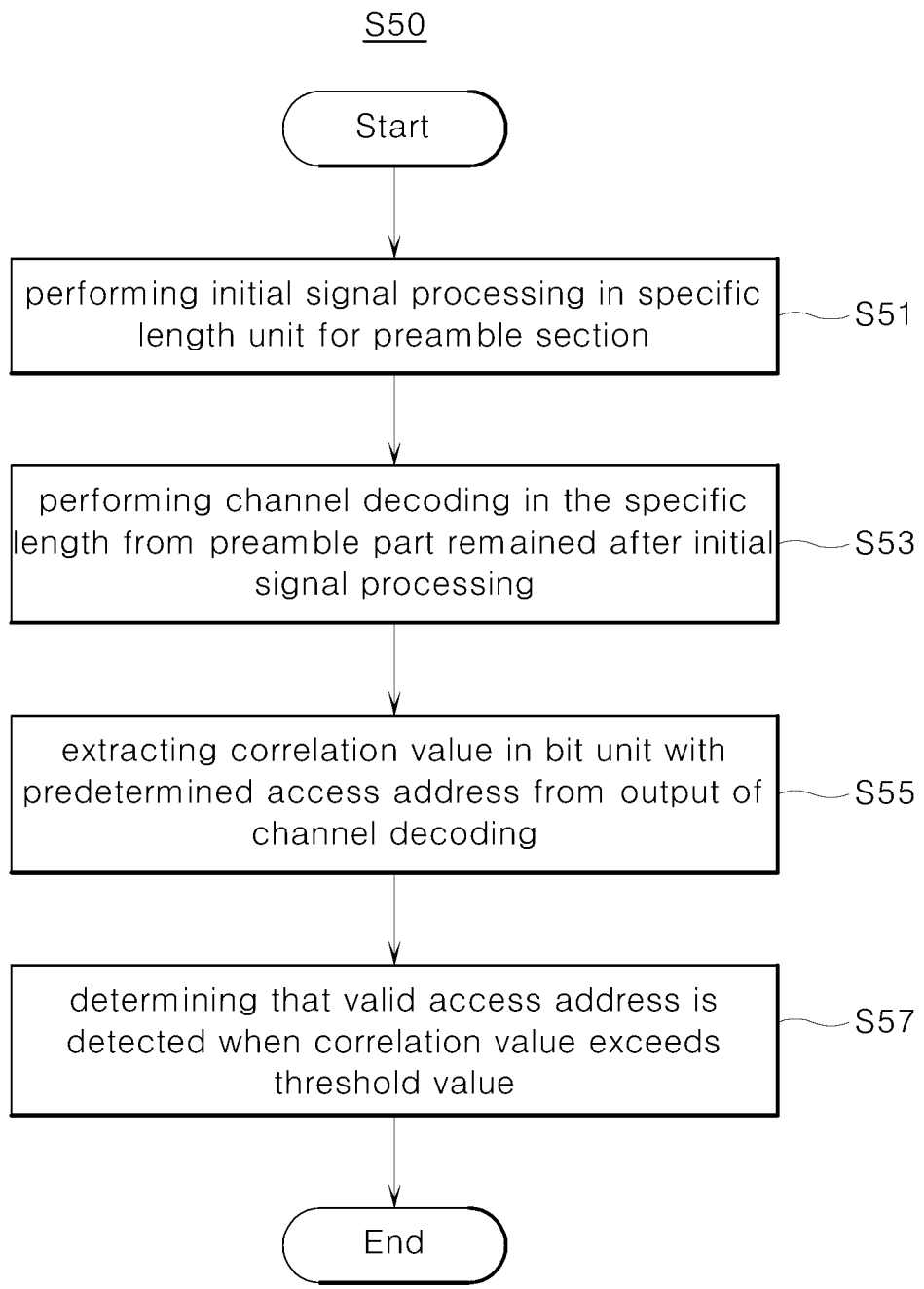
FIG. 5 is a view of a flowchart showing a detail example of an access address detection method of a Bluetooth signal to which channel coding is applied according to an embodiment of the present invention.

FIG. 5 is a view of a flowchart S50 showing a detailed example of a method of detecting an access address of a Bluetooth signal to which channel coding is applied according to an embodiment of the present invention.

Referring to FIG. 5, in order to detect an access address of a physical channel in a Bluetooth signal to which channel coding is applied, a method is shown in the flowchart where an access address is detected even though a start point of an access address is not provided.

In S51, initial signal processing may be performed in a specific length unit for a preamble section of a received Bluetooth signal. Herein, initial signal processing means automatic gain control, frequency synchronization, packet detection, symbol timing estimation, etc., and the specific length means a unit length of a bitstream.

Subsequently, how many bits are desirable for the specific length will be described.

As described in FIGS. 3 and 4, channel coding of Bluetooth 5.0 is performed by using a convolutional code and a repetition code. The convolutional code outputs 2 bits for an input of 1 bit, and the repetition code outputs 4 bits for an input of 1 bit. Accordingly, by performing channel coding, 8 bits are output when 1 bit is input. Therefore, channel decoding in the receiver has to be performed in a unit of 8 bits. In other words, for channel decoding, 8 bits is input, and 1 bit is output.

Figure 6:
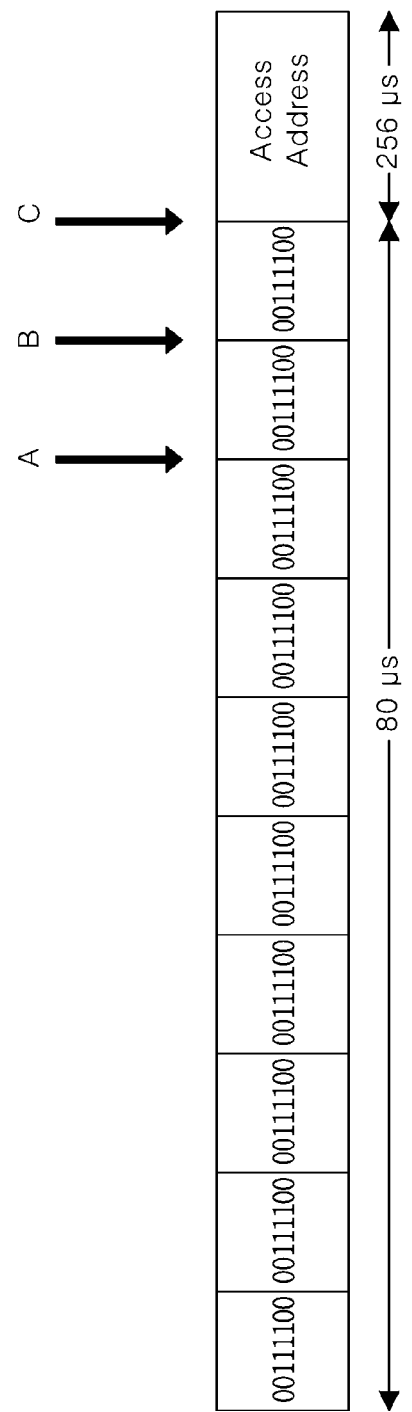
FIG. 6 is a view showing a preamble and an access address, and timings at which channel coding is available according to an embodiment of the present invention.

Meanwhile, channel coding is not applied to a preamble section, and a bit pattern of "'00111100" is repeated ten times therein (refer to FIG. 6). Accordingly, processing for the preamble section may be available in a unit of 4 bits or in a unit of 8 bits.

However, channel decoding is performed in a unit of 8 bits in the receiver of Bluetooth 5.0 and a start point of an access address is not provided, so that initial signal processing of a preamble has to be performed in a unit of 8 bits, such that a point, at which a bit correlation value becomes the maximum in an output of channel decoding, is not changed even though channel decoding starts in a preamble part remained after performing initial signal processing. In other words, a bit-matching operation of channel decoding is performed in 8 bits, and thus a point at which a bit correlation value becomes the maximum is not changed even though the channel decoding is performed at any point in the middle of the preamble section to which the channel coding is not applied.

Accordingly, by determining a length of a bitstream to a specific length at which a bit-matching operation of channel decoding is allowed and processing of a bit pattern repeated in a preamble section is simultaneously performed, detection of an access address is available by starting channel decoding from the midpoint of the preamble section. When a length of a repeated bit pattern of the preamble does not match with a length of an input bitstream of channel decoding, detection of an access address may not be available.

Based on the above, in S53, channel decoding may be performed in a specific length from a preamble part remained after initial signal processing for the preamble section is completed. The specific length may be a length of a bit pattern of a bitstream which is repeated in the preamble section, or a length of a bitstream input to channel decoding. Referring to FIG. 6, points represented by A, B, and C are start points at which channel decoding is available in the Bluetooth receiver.

In S55, a correlation value in a bit unit with a predetermined access address is extracted from a result that is output from channel decoding, and in S57, when the extracted correlation value exceeds a preset threshold value, it may be determined that a valid access address is detected.

Figure 7:
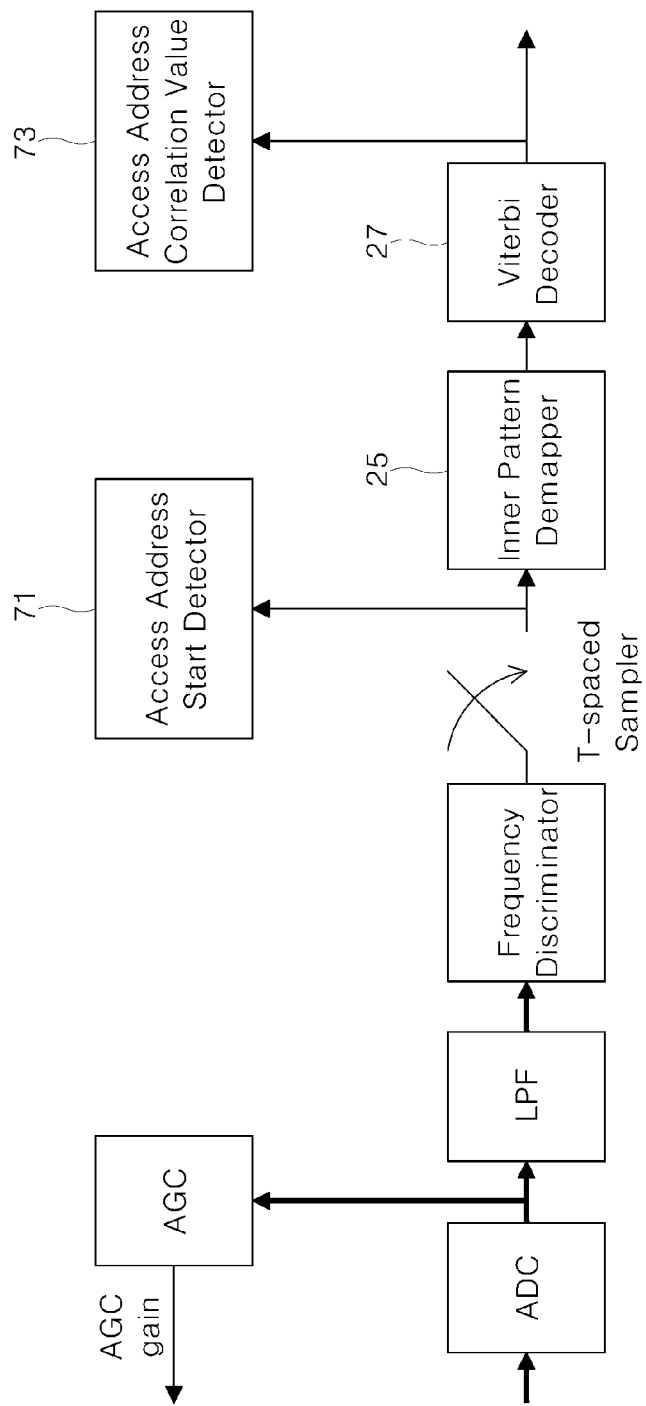
FIG. 7 is a view of a block diagram showing an apparatus for detecting an access address of a Bluetooth signal to which channel coding is applied according to an embodiment of the present invention.

FIG. 7 is a view of a block diagram showing an apparatus for detecting an access address of a Bluetooth signal to which channel coding is applied according to an embodiment of the present invention.

Referring to FIG. 7, a general receiver of the coded PHY of Bluetooth 5.0 shown in FIG. 2 is shown in detail, and in addition to automatic gain control (AGC), demodulation blocks of the receiver, an access address start detector 71, and an access address correlation value detector 73 are shown. Blocks for packet detection, frequency offset estimation and timing offset estimation are omitted since they are not related to the present invention.

An apparatus for detecting an access address of a Bluetooth signal to which channel coding is applied according to the present invention includes an access address correlation value detector 73 as an essential component, and may further include an access address start detector 71.

The access address start detector 71 is a block detecting a start point of an access address, and is provided in an input part of the inner pattern demapper 25. The detailed operation thereof will be described in S80 of FIG. 8.

The access address correlation value detector 73 is provided in an output part of the Viterbi decoder 27, extracts a correlation value in a bit unit with a predetermined access address from a result that is output from channel decoding. When the extracted correlation value exceeds a preset threshold value, it is determined that a valid access address is detected (S55 and S57).

Figure 8:
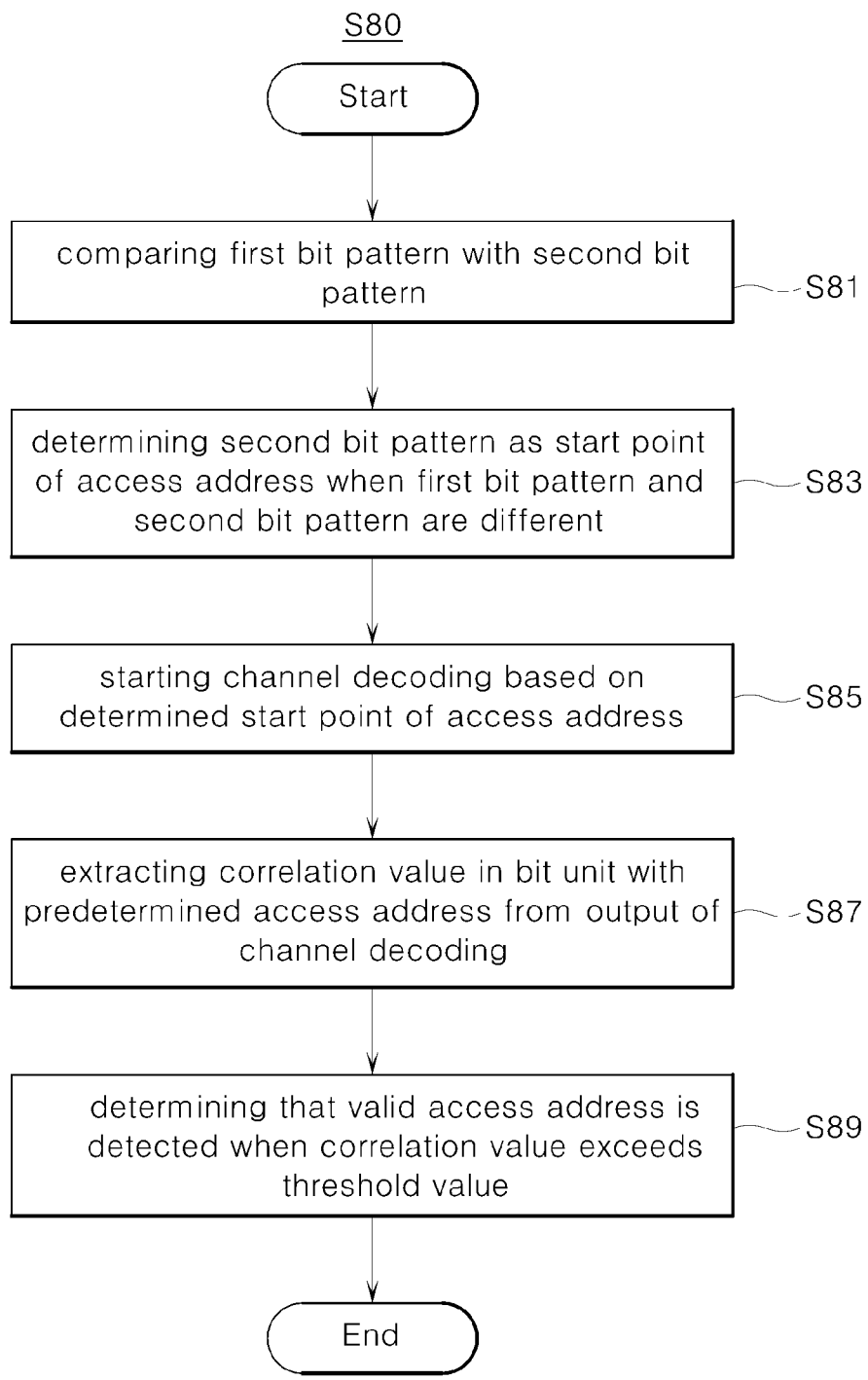
FIG. 8 is a view of a flowchart showing a method of detecting an access address of a Bluetooth signal to which channel coding is applied according to another embodiment of the present invention.

FIG. 8 is a view of a flowchart S80 showing a detailed example of a method of detecting an access address of a Bluetooth signal to which channel coding is applied according to another embodiment of the present invention access address, and definitely detecting a start point.

Referring to FIG. 8, a method is shown where a start point of an access address is identified by using a feature that a bit pattern repeated in a preamble and a bit pattern of a start part of the access address are different. Then, an original access address is output by performing decoding from the determined start point of an access address, a correlation value with a preset access address is calculated from the output access address, and then, whether or not a received packed is valid is determined by using the calculated correlation value.

As described with reference to FIG. 6, channel coding is not applied to a preamble section in a packet of a coded PHY of Bluetooth 5.0, and a bit pattern of "00111100" is repeated ten times therein.

Meanwhile, for an access address to which channel coding is applied and considering the convolutional encoder 21 of FIG. 3 and the inner pattern mapper 23 of FIG. 4, when a first bit of the access address is "0", "00110011" is output, and when the first bit is "1", "11001100" is output.

Accordingly, by using a feature that an 8-bit pattern of the preamble section which is "00111100" and an 8-bit pattern of a start part of the access address which is "00110011" "11001100" are different, determining a start point of the access address is available.

Based on the above description, in S81, as a method of detecting an access address of a Bluetooth signal to which channel coding is applied, a first bit pattern may be compared with a second bit pattern.

The first bit pattern is a bitstream having a specific length and repeated a predetermined times in a received Bluetooth signal, and in the present invention, the first bit pattern may be "00111100".

The second bit pattern is a bitstream having a length identical to the length of the first bit pattern, and present in continuation to the first bit pattern, and in the present invention, the second bit pattern may be "00110011" or "11001100".

Accordingly, in S83, when the comparison result in step S81 is determined to be different, that is, when the first bit pattern differs from the second bit pattern, the second bit pattern may be determined to be a start point of the access address.

When the start point of the access address is determined in S83, in S85, channel decoding is started on the basis of the determined start point of the access address.

In S87, a correlation value in a bit unit with a preset access address is extracted from a result that is output from channel decoding, and in S89, when the extracted correlation value exceeds a preset threshold value, it may be determined that a valid access address is detected.

As described above, according to the embodiments, in order to detect an access address of a physical channel in a Bluetooth signal to which channel coding is applied, after performing automatic gain control, frequency synchronization, packet detection, and symbol timing estimation which are initial signal processing in a preamble section, channel decoding is performed in a unit of a bit pattern length of an access address from the remaining preamble part, and thus detection of the access address is available even though a start point of the access address is not provided.

In addition, by using a feature that a bit pattern of a preamble and a bit pattern of an access address are different, a start point of the access address is definitely detected.

In addition, an embodiment of a method of detecting an access address of a Bluetooth signal to which channel coding is applied which is described as above may be implemented in the form of program instructions that may be executed through various computing configuration components. In addition, the implemented program instruction may be a computer-readable recording medium. Examples of the computer-readable recording medium include ROM, a magnetic disc or compact disc, an optical disc, etc., but it is not limited thereto.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of detecting an access address of a Bluetooth signal to which channel coding is applied, the method comprising:
   performing initial signal processing in a unit of a specific length for a first preamble part within a preamble section of the Bluetooth signal;
   performing, in a unit of the specific length, channel decoding for a second preamble part remained after the first preamble part within the preamble section, wherein the channel decoding starts at the middle of the preamble section;
   extracting a correlation value in a bit unit with a preset access address from an output of the channel decoding; and
   determining that a valid access address is detected when the correlation value exceeds a threshold value,
   wherein the specific length is a bit pattern length of a bitstream which is repeated in the preamble section or a length of a bitstream input for the channel decoding, and
   wherein the channel decoding performed on the second preamble part is performed before the extracting of the correlation value.

2. The method of claim 1,
   wherein the initial signal processing is any one of automatic gain control, frequency synchronization, packet detection, and symbol timing estimation.

3. A Bluetooth apparatus for detecting an access address of a Bluetooth signal to which channel coding is applied, the Bluetooth apparatus comprising:
   a radio frequency (RF) receiver configured to receive the Bluetooth signal; and
   an access address start detector configured to:
   perform initial signal processing in a unit of a specific length for a first preamble part within a preamble section of the Bluetooth signal;
   perform, in a unit of the specific length, channel decoding for a second preamble part remained after the first preamble part within the preamble section, wherein the channel decoding starts at the middle of the preamble section;
   extract a correlation value in a bit unit with a preset access address from an output of the channel decoding; and
   determine that a valid access address is detected when the correlation value exceeds a threshold value,
   wherein the specific length is a bit pattern length of a bitstream which is repeated in the preamble section or a length of a bitstream input for the channel decoding, and
   wherein the channel decoding performed on the second preamble part is performed before the extracting of the correlation value.

4. The Bluetooth apparatus of claim 3,
   wherein the initial signal processing is any one of automatic gain control, frequency synchronization, packet detection, and symbol timing estimation.

* * * * *